US012294582B2

(12) United States Patent
Nguyen et al.

(10) Patent No.: US 12,294,582 B2
(45) Date of Patent: May 6, 2025

(54) COMMUNICATION NETWORK RESILIENCE BASED ON DISTRIBUTED MULTI-AGENT Q-LEARNING ALGORITHM

(71) Applicant: KBR Wyle Services, LLC, Houston, TX (US)

(72) Inventors: Lan Kim Nguyen, Mission Viejo, CA (US); Elsa Newman Schaefer, Fairfax, VA (US); Robert Arthur Hughes, Jr., Bayfield, CO (US)

(73) Assignee: KBR WYLE SERVICES, LLC, Houston, TX (US)

( * ) Notice: Subject to any disclaimer, the term of this patent is extended or adjusted under 35 U.S.C. 154(b) by 72 days.

(21) Appl. No.: 18/327,347

(22) Filed: Jun. 1, 2023

(65) Prior Publication Data

US 2023/0396623 A1 Dec. 7, 2023

Related U.S. Application Data

(60) Provisional application No. 63/354,410, filed on Jun. 22, 2022, provisional application No. 63/348,816, filed on Jun. 3, 2022.

(51) Int. Cl.
*H04L 41/046* (2022.01)
*H04L 9/40* (2022.01)
*H04L 41/16* (2022.01)

(52) U.S. Cl.
CPC .......... *H04L 63/101* (2013.01); *H04L 41/046* (2013.01); *H04L 41/16* (2013.01); *H04L 63/108* (2013.01)

(58) Field of Classification Search
None
See application file for complete search history.

(56) References Cited

U.S. PATENT DOCUMENTS

| 7,013,395 B1 | 3/2006 | Swiler et al. |
| 7,068,998 B2 | 6/2006 | Zavidniak |

(Continued)

FOREIGN PATENT DOCUMENTS

| CN | 107347069 A | 11/2017 |
| CN | 110781614 A | 2/2020 |

(Continued)

OTHER PUBLICATIONS

Han et al. (May 2020). "Spatial Anti-Jamming Scheme for Internet of Satellites Based on the Deep Reinforcement Learning and Stackelberg Game," IEEE Transactions on Vehicular Technology 69(5):5331-5342.

(Continued)

*Primary Examiner* — Brian Whipple
(74) *Attorney, Agent, or Firm* — Gary M. Machetta

(57) ABSTRACT

A method for strengthening communication network resilience at a source agent of the communication network, comprising accessing an access list comprising communication relay agents available to the source agent. The method further comprising accessing a Q-table that corresponds to the communication relay agents available to the source agent. The method further comprising the source agent transitioning from communicating via a current communication relay agent to communicating via a new communication relay agent at a time slot, wherein the new communication relay agent is determined based on a set of entries in the Q-table. The method further comprising receiving data indicative of an actual reward for transitioning to the new communication relay agent, and updating the entry in the Q-table corresponding to the transition from the current communication relay agent to the new communication relay agent.

20 Claims, 9 Drawing Sheets

(56) References Cited

U.S. PATENT DOCUMENTS

| | | |
|---|---|---|
| 7,804,962 B2 | 9/2010 | Roy et al. |
| 7,907,888 B2 | 3/2011 | Sun et al. |
| 8,863,293 B2 | 10/2014 | Christodorescu et al. |
| 9,286,473 B2 | 3/2016 | Cruz Mota et al. |
| 9,979,743 B2 | 5/2018 | Hovor et al. |
| 10,073,965 B2 | 9/2018 | Jantz et al. |
| 10,193,913 B2 | 1/2019 | Machlica et al. |
| 10,291,646 B2 | 5/2019 | Stolarz et al. |
| 11,050,770 B2 | 6/2021 | Nanda et al. |
| 2006/0143709 A1 | 6/2006 | Brooks et al. |

FOREIGN PATENT DOCUMENTS

| | | |
|---|---|---|
| CN | 110081897 B | 10/2020 |
| CN | 110611619 B | 10/2020 |
| CN | 110138764 B | 4/2021 |
| CN | 111726338 B | 7/2021 |
| CN | 113747536 A | 12/2021 |
| WO | 2021244743 A1 | 12/2021 |

OTHER PUBLICATIONS

Shamshirband et al. (Jun. 2014). "Cooperative Game Theoretic Approach Using Fuzzy Q-learning for Detecting and Preventing Intrusions in Wireless Sensor Networks," Engineering Applications of Artificial Intelligence 32:228-241.

Wang et al. (May 2021). "Learning-Based Online Transmission Path Selection for Secure Estimation in Edge Computing Systems," IEEE Transactions on Industrial Informatics 17(5):3577-3587.

Yan et al. (Jan. 2017). "Q-Learning-Based Vulnerability Analysis of Smart Grid Against Sequential Topology Attacks," IEEE Transactions on Information Forensics and Security 12(1):200-210.

Zhang et al. "An Intelligent Route Mutation Mechanism against Mixed Attack based on Security Awareness," 2019 IEEE Global Communications Conference (GLOBECOM), Dec. 9-13, 2019, Waikoloa, HI, USA; 6 pages.

Zhou et al. (Apr. 2021). "Adaptive Routing Strategy Based on Improved Double Q-Learning for Satellite Internet of Things," Security and Communication Networks 2021:11 pages.

FIG. 4A

| $0, 1 (n_a, t_i)$ | 0 | 1 | 2 |
|---|---|---|---|
| 0, 2 | r1 | r2 | r3 |
| 1, 1 | r4 | r5 | r6 |
| 1, 2 | r7 | r8 | r9 |
| . . . | r10 | r11 | r12 |
| | . . . | . . . | . . . |

FIG. 4B

| $(n_a, t_j, a_x)$ | predicted reward |
|---|---|
| 0, 1, 0 | r1 |
| 0, 1, 1 | r2 |
| 0, 1, 2 | r3 |
| 0, 2, 0 | r4 |
| 0, 2, 1 | r5 |
| 0, 2, 2 | r6 |
| . . . | . . . |

FIG. 4C

COMMUNICATION NETWORK RESILIENCE BASED ON DISTRIBUTED MULTI-AGENT Q-LEARNING ALGORITHM

CROSS-REFERENCE TO RELATED APPLICATIONS

This application claims the benefit of U.S. Provisional Application No. 63/348,816, filed Jun. 3, 2022, and U.S. Provisional Application No. 63/354,410, filed Jun. 22, 2022, the entire contents of each of which is incorporated herein by reference.

FIELD

This disclosure generally relates to Q-learning for communication network resilience.

BACKGROUND

Modern communication networks constantly transmit large amounts of data between different entities. However, communication networks do not have an unlimited supply of resources, and environmental factors such as the networks' size or data load may strain the networks. Various different adversaries may want to attack these communication networks and also maximize the disruption they can cause. This could lead to disastrous results and also difficult for the networks to consistently handle adequately with limited resources. Further complicating the networks' defense strategy is that the attacks can be coordinated or uncoordinated and the attacking models or strategies are unknown to the networks. Traditional solutions have largely taken the approach of having centralized decision making to address the attacks. However, such approaches become computationally prohibitive as the networks grow in size and become too large for real-time application.

SUMMARY

The present disclosure describes a method of applying Q-learning to strengthen a communication network's resilience to attacks by adversaries. The method may be executed by an agent in the communication network, enabling the method to scale with increasingly large communication networks while removing the need for a centralized entity. The network agent may communicate through different communication paths at different time slots based on which of the available communication paths may be the optimal communication path at a given time slot. The network agent may receive feedback for selecting to communicate through a given communication path, which the network agent may then incorporate into an appropriate Q-table that the network agent may subsequently use to make better determinations of the optimal communication path at a given time slot.

In various embodiments, a method for strengthening communication network resilience, includes, at a source agent of the communication network, accessing an access list comprising communication relay agents available to the source agent. The method further includes accessing a Q-table, from among a plurality of Q-tables, that corresponds to the communication relay agents available to the source agent, wherein each entry in the Q-table indicates a predicted reward for transitioning from a first relay agent of the communication relay agents to a second relay agent of the communication relay agents at a specified time slot. The method further includes transitioning from communicating via a current communication relay agent to communicating via a new communication relay agent at a time slot, wherein the new communication relay agent is determined based on a set of entries in the Q-table, wherein the set of entries comprises entries in the Q-table corresponding to transitioning from the current communication relay agent to each of the communication relay agents at the time slot. The method further includes receiving data indicative of an actual reward for transitioning to the new communication relay agent, and updating the entry in the Q-table corresponding to the transition from the current communication relay agent to the new communication relay agent at the time slot based on the received data indicative of the actual reward.

Optionally, determining the new communication relay agent includes the source agent sending data associated with the set of entries in the Q-table to an agent manager, wherein the agent manager is configured to determine the new communication relay agent using the data.

Optionally, the agent manager determines the new communication relay agent by identifying a communication relay agent from the access list that is different than each of a plurality of other relay agents in the communication network that are assigned to a plurality of other source agents in the communication network.

Optionally, the data that is sent to the agent manager includes a random permutation of the communication relay agents.

Optionally, the data that is sent to the agent manager includes the communication relay agents in a ranked order.

Optionally, the new communication relay agent is the second relay agent of the entry with the greatest predicted reward among the set of entries in the Q-table.

Optionally, the new communication relay agent is randomly selected from the communication relay agents according to a predefined probability.

Optionally, updating the entry in the Q-table includes scaling an original predicted reward amount in the entry by a predefined learning rate and the received actual reward by a predefined discount factor.

Optionally, the Q-table is pre-trained offline before being deployed to the source agent.

Optionally, the source agent includes a time slot counter for tracking a number of consecutive time slots the source agent has been communicating via a given communication relay agent, wherein the time slot counter increments at each time slot.

Optionally, the time slot counter resets after the source agent transitions to communicating via the new communication relay agent.

Optionally, the source agent includes a time slot threshold for tracking a maximum number of consecutive time slots the source agent can communicate via the given communication relay agent.

Optionally, the source agent transitions to communicating via the new communication relay agent when the time slot counter reaches the time slot threshold.

Optionally, the received actual reward is based on a quality of a message received by a destination agent, wherein the message is communicated by the source agent through the new communication relay agent.

Optionally, the actual reward is received through one of the communication relay agents that is different than the new communication relay agent.

Optionally, the new communication relay agent is selected further based on a weight vector with weights for each of the communication relay agents, wherein the weights are based on a likelihood that each of the communication relay agents will be attacked by adversaries.

Optionally, the received actual reward is based on a signal-to-noise ratio.

Optionally, the received actual reward is based on a bit error rate.

In various embodiments, one or more computer-readable non-transitory storage media embody software for strengthening communication network resilience at a source agent of the communication network, the software including instructions operable when executed by a computing system to access an access list comprising communication relay agents available to the source agent. The software is further operable when executed by the computing system to access a Q-table, from among a plurality of Q-tables, that corresponds to the communication relay agents available to the source agent, wherein each entry in the Q-table indicates a predicted reward for transitioning from a first relay agent of the communication relay agents to a second relay agent of the communication relay agents at a specified time slot. The software is further operable when executed by the computing system to transition from communicating via a current communication relay agent to communicating via a new communication relay agent at a time slot, wherein the new communication relay agent is determined based on a set of entries in the Q-table, wherein the set of entries comprises entries in the Q-table corresponding to transitioning from the current communication relay agent to each of the communication relay agents at the time slot. The software is further operable when executed by the computing system to receive data indicative of an actual reward for transitioning to the new communication relay agent, and update the entry in the Q-table corresponding to the transition from the current communication relay agent to the new communication relay agent at the time slot based on the received data indicative of the actual reward.

In various embodiments, a system for strengthening communication network resilience at a source agent of the communication network includes one or more processors and a memory coupled to the processors comprising instructions executable by the processors, the processors being operable when executing the instructions to cause the system to access an access list comprising communication relay agents available to the source agent. The processors are further operable when executing the instructions to cause the system to access a Q-table, from among a plurality of Q-tables, that corresponds to the communication relay agents available to the source agent, wherein each entry in the Q-table indicates a predicted reward for transitioning from a first relay agent of the communication relay agents to a second relay agent of the communication relay agents at a specified time slot. The processors are further operable when executing the instructions to cause the system to transition from communicating via a current communication relay agent to communicating via a new communication relay agent at a time slot, wherein the new communication relay agent is determined based on a set of entries in the Q-table, wherein the set of entries comprises entries in the Q-table corresponding to transitioning from the current communication relay agent to each of the communication relay agents at the time slot. The processors are further operable when executing the instructions to cause the system to receive data indicative of an actual reward for transitioning to the new communication relay agent, and update the entry in the Q-table corresponding to the transition from the current communication relay agent to the new communication relay agent at the time slot based on the received data indicative of the actual reward.

BRIEF DESCRIPTION OF THE FIGURES

FIGS. 4A-4C illustrate example implementations of a three-dimensional Q-table according to some examples of the present disclosure.

DETAILED DESCRIPTION

Figure 1:
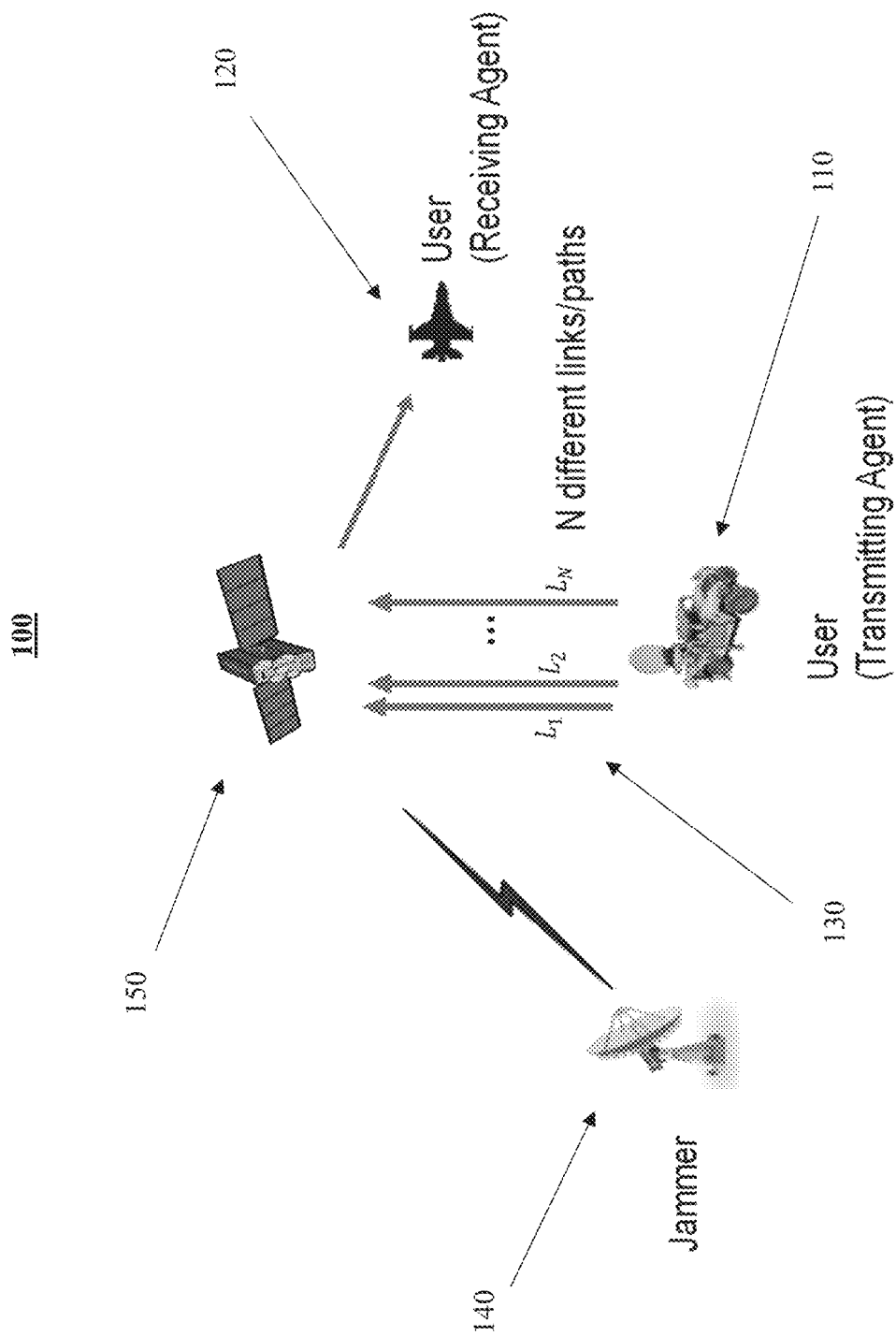
FIG. 1 illustrates an example scenario of a satellite communication uplink jamming example.

The present disclosure describes a method of applying Q-learning to strengthen a communication network's resilience to attacks by adversaries, which may be executed by an agent in the communication network. Strengthening the communication network resilience may allow communication messages to be delivered from one agent, such as a source agent, to another agent, such as a receiving agent, despite attacks to the communication network. The communication network may include various relay agents that help facilitate the delivery of communication messages through the communication network. The method for strengthening the communication network's resilience may include the source agent accessing an access list with the relay agents that are available to the source agent. The available relay agents may be the agents that the source agent is able to use to transmit a communication message to the receiving agent.

After accessing the access list, the source agent may access a Q-table from a plurality of Q-tables based on the relay agents that are included in the access list. The source agent may communicate via any of the relay agents included in the access list, and the entries in the accessed Q-table may indicate the predicted utility or predicted reward associated with the source agent transitioning from communicating via one of the relay agents to communicating via another one of the relay agents.

The source agent may use the information in the entries of the accessed Q-table to transition to communicating via a different one of the relay agents from the access list. After making the transition, the source agent may receive data indicative of an actual reward corresponding to that action. The source agent may use the data for the actual reward to update the appropriate entry in the Q-table that corresponds to the transition the source agent made.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates an example scenario 100 of satellite communication (SATCOM) uplink jamming which the present disclosure aims to address. In the example scenario 100, a transmitting agent 110 initiates communication through SATCOM 150 to the receiving agent 120. An agent as used herein may represent a user and/or a node of a communication network. A communication network node may be any device capable of communicating in the network over a wired or wireless channel. Examples of communication network nodes may include handheld devices, communication towers, communications gateways, satellites, routers, network switches, modems, among many others. In FIG. 1, the transmitting agent 110 and receiving agent 120 represent the two users communicating through SATCOM 150, however, an agent may also represent a network node or connection point in a communications network. The transmitting agent 110 in FIG. 1 employs path diversity to deliver communication messages to the receiving agent 120. More specifically, the transmitting agent 110 may utilize any one of the N different links/paths 130, or relays, to deliver communication messages. The path diversity may be supported through different satellites, different antenna beams, and/or different frequency bands for the different relays. An intelligent attacker, or the jammer 140 in the example, may attack the different relays 130 according to a probability of attacks vector $q^{(1)}$. The number of elements in the attack vector $q^{(1)}$ may correspond to the number of different relays 130 that the transmitting agent 110 may use. Each element of $q^{(1)}$ may represent the probability of the jammer 140 attacking a corresponding relay. The probability of attacks vector $q^{(1)}$ is unknown to the transmitting agent 110, and the transmitting agent 110 also does not receive any indication about when the jammer 140 will launch attacks. Even so, the SATCOM 150 may need to remain operational and resilient despite the unpredictable attacks.

Figure 2:
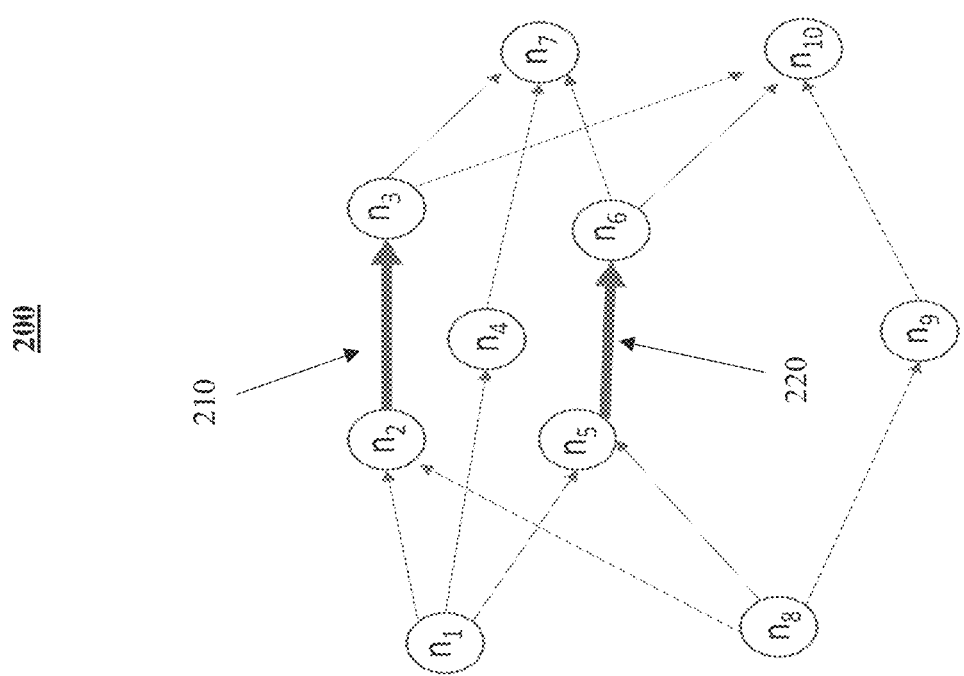
FIG. 2 illustrates an example communication network schematic.

FIG. 2 illustrates an example communication network schematic 200 that will also be referenced further herein. The example communication network in the schematic 200 comprises a plurality of agents ($n_1$, $n_2$, $n_3$, etc.) and links (→), where the links connect the agents to form communication or relay paths. As such, agents in a relay path may also be referred to herein as relay agents. More specifically, for the relay path $n_1 \rightarrow n_2 \rightarrow n_3 \rightarrow n_7$, $n_2$ and $n_3$, and in some instances $n_7$ as indicated further herein, would be the relay agents. $n_1$ is not regarded as a relay agent, at least for this specific relay path, as it is the source of the relay path. The agent that is the source of a relay path will be referred to as the source agent herein. Although $n_7$ may be regarded as a relay agent in some instances, $n_7$ is also the terminal destination of this particular relay path. Agents at the end of a relay path will be referred to as the destination agent herein. As such, the transmitting agent 110 of FIG. 1 may be considered a source agent and the receiving agent 120 of FIG. 1 may be considered a destination agent.

In the example network schematic 200 of FIG. 2, it may be noted that there may be multiple relay paths between a given source and destination agent. For example, if $n_1$ is the source agent and $n_7$ is the destination agent, there are three distinct relay paths from $n_1$ to $n_7$: $n_1 \rightarrow n_2 \rightarrow n_3 \rightarrow n_7$, $n_1 \rightarrow n_4 \rightarrow n_7$, and $n_1 \rightarrow n_5 \rightarrow n_6 \rightarrow n_7$. These relay paths may also correspond to the links/paths or relays 130 $L_1$, $L_2$, ..., $L_N$ of FIG. 1 used by the transmitting agent 110 to communicate with the receiving agent 120. It may also be noted that links in a given relay path may be shared with another relay path such that multiple relay paths at least partially overlap with one another. More specifically, the links from $n_2$ to $n_3$ 210 and from $n_5$ to $n_6$ 220 are part of the available relay paths where $n_1$ and $n_8$ are the source agents. As a result, the path of $n_1 \rightarrow n_2 \rightarrow n_3 \rightarrow n_7$ partially overlaps with the path $n_8 \rightarrow n_2 \rightarrow n_3 \rightarrow n_{10}$. On the other hand, however, it is not required that relay paths partially overlap, as can be seen with the path $n_1 \rightarrow n_4 \rightarrow n_7$, which does not have any overlap with any other relay path from $n_8$.

For each source agent in the network schematic 200, there may be a corresponding access list of relay agents. An access list as used herein is defined as the first layer of relay agents across the relay paths available to the source agent. For the example network schematic 200, the access list for the $n_1$ agent is $\{n_2, n_4, n_5\}$. This is because those agents are the first layer of relay agents in the relay paths available to $n_1$ as the source agent. As mentioned above, the three relay paths available to $n_1$ as the source agent are $n_1 \rightarrow n_2 \rightarrow n_3 \rightarrow n_7$, $n_1 \rightarrow n_4 \rightarrow n_7$, and $n_1 \rightarrow n_5 \rightarrow n_6 \rightarrow n_7$, and $n_2$, $n_4$, and $n_5$ are the first relay agents in each of those paths, thus comprising the access list for $n_1$. Similarly, the access list for the $n_8$ agent is $\{n_2, n_5, n_9\}$ as those agents are the first layer of relay agents in the three relay paths available to $n_8$ as the source agent: $n_8 \rightarrow n_2 \rightarrow n_3 \rightarrow n_{10}$, $n_8 \rightarrow n_5 \rightarrow n_6 \rightarrow n_{10}$, and $n_8 \rightarrow n_9 \rightarrow n_{10}$. It may be noted that the access list for a source agent may change dynamically in response to changes in the network that may result from agents dropping out of the network or agents being added to the network, perhaps as a result of agents being disabled, parts of different networks being joined, or other actions by network administrators. It may be noted that the present disclosure assumes that a source agent may only control which of the relay agents in its access list to utilize for a given communication. Thus, references herein to a source agent selecting or transitioning to communicating through a particular relay agent will only refer to the source agent selecting or transitioning to one of the relay agents from its access list. Once the communication has been relayed from the source agent to the source agent's choice of relay agent from the access list, the source agent may no longer have control over the exact relay path that the communication will travel across to a destination, even if the relay agent branches into multiple relay paths. As such, references herein to a source agent communicating through or communicating via a relay path will only refer to the source agent selecting that specific relay agent from its access list to relay a communication without control over the exact sequence of relay agents that the communication will take to reach a destination.

It should further be noted that the example network schematic 200 of FIG. 2 is meant solely as an example and not limiting in any way of the networks that the present disclosure may apply to. Consequently, the relevant components of a network in regards to the present disclosure may differ from the presented example in FIG. 2. However, the descriptions in the present disclosure using FIG. 2 as an example may apply equally to any other network schematic.

Figure 3:
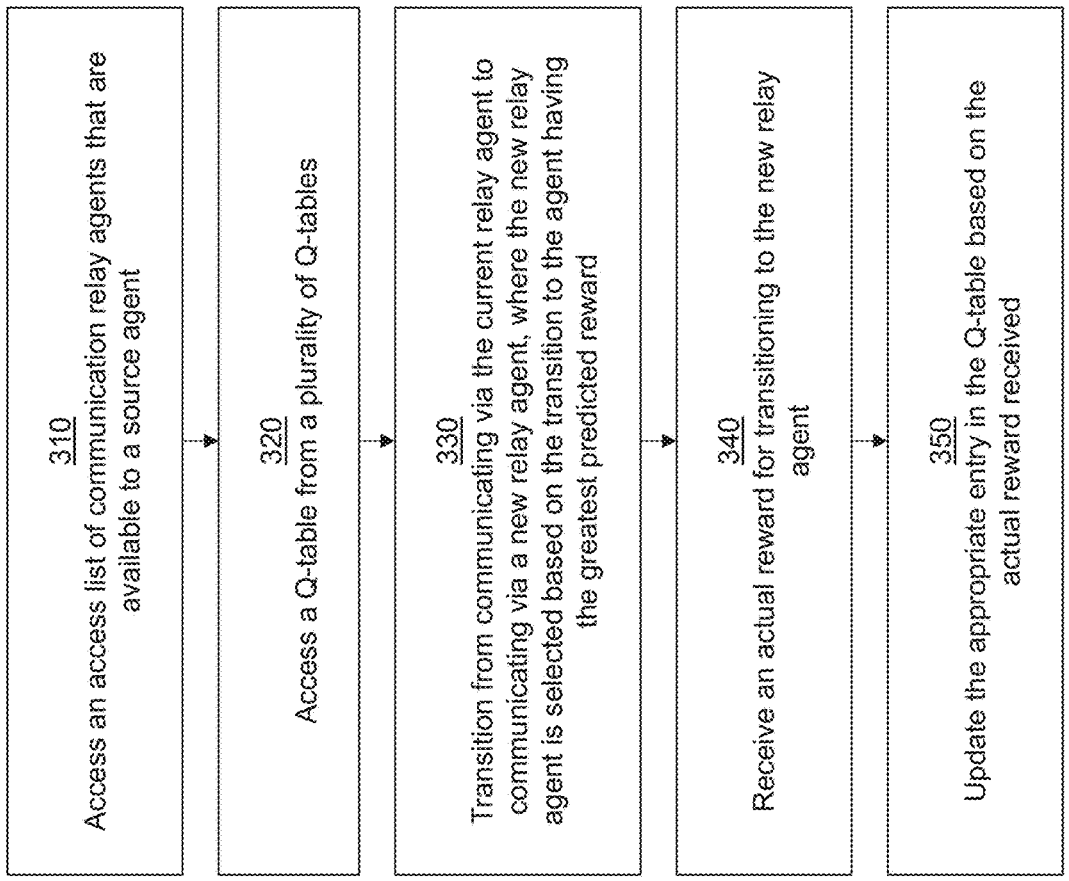
FIG. 3 illustrates a flowchart for a method of applying Q-learning to strengthen communication network resilience according to some examples of the present disclosure.

FIG. 3 illustrates a flowchart of an exemplary method 300 of using Q-learning for strengthening communication network resilience. The exemplary method may be performed at or by a source agent of a communication network, but it may be noted that the method may also be performed at or by other agents. At step 310, the source agent may access an access list of communication relay agents that are available to the source agent. As discussed above, the access list comprises the first layer of relay agents in a communication network across the relay paths available to the source agent. The access list may be accessed in various manners in different examples of the present disclosure. A straightforward approach may comprise the source agent locally maintaining an access list, which the source agent may directly access and update when needed. The source agent may need to update its access list as the access list may change unpredictably as the network structure changes, perhaps as a result of agents dropping in and out of the network or as a result of administrator intervention. Alternatively, it may also be appropriate to instead have the source agent construct, or query for, its access list when it is needed. This approach may require the source agent to obtain access to the network in order to identify the relay agents it is able to communicate through at a given time. With various communication networks, it may be necessary for the source agent to submit requests to the network's administrator to request access to the access list or information that may be used to deduce the access list. It may also be necessary for the source agent to satisfy any number of prerequisite requirements in order to gain access to the access list, such as but not limited to entering agreements and/or contracts with the network's provider or administrator. However, it may be noted that step 310 may be satisfied regardless of the exact manner in which the access list may be accessed.

At step 320, the source agent may access a Q-table from among a plurality of Q-tables. The specific Q-table that is accessed may be based on the access list obtained in step 310, while the plurality of Q-tables to choose from may comprise the Q-tables that correspond to the different access lists that are possible for a source agent in a network. Each Q-table may comprise three-dimensional data which may be used to help identify the optimal relay agent a source agent should communicate through. The three dimensions of the Q-table data may be: n, representing the number of relay agents currently available to the source agent in the communication network; t, representing the maximum number of consecutive time slots that the source agent may communicate via any given relay agent; and a, representing the number of actions that the source agent may take at each time slot. For the example network in FIG. 2, the appropriate Q-table that may be accessed with $n_1$ as the source agent may have an n dimension of three, corresponding to the three relay agents that are available to $n_1$. The values in this n dimension may be indexes for the relay agents. For the example network in FIG. 2, the values may be $\{0, 1, 2\}$ corresponding to the zero-based indexes for the relay agents $n_2$, $n_4$, and $n_5$, respectively. The mapping between the index and a relay agent may need some structure in order for the Q-table to apply to different access lists of the same size. For example, a straightforward structure may be that the relay agents are mapped to indexes according to some innate ascending order between the relay agents, so the relay agents closer to the beginning of the order are always mapped to lower indexes whereas the relay agents closer to the end of the order are always mapped to the higher indexes. In the example network schematic 200 of FIG. 2, the order of the $n_2$, $n_4$, and $n_5$ relay agents in $n_1$'s access list may result in $n_2$ being mapped to the $0^{th}$ index, $n_4$ to the $1^{st}$ index, and $n_5$ to the $2^{nd}$ index as the n dimension values. However, this structure is arbitrary and many other structures may be appropriate, if any structure is implemented at all.

Alternatively, in other examples of the present disclosure, the n dimension values may be the actual relay agents available to the source agent in a given network. As a result, the values in this dimension in such examples may be the same as the access list of a source agent. For the example network in FIG. 2, the n dimension values in the Q-table corresponding to the access list of $n_1$ may be $\{n_2, n_4, n_5\}$, which is the same as $n_1$'s access list itself. This also means there may be separate Q-tables for each access list, even if the access lists are the same size. More specifically, for the example network in FIG. 2, $n_1$ has an access list of $\{n_2, n_4, n_5\}$, but if the access list changes to say $\{n_2, n_4, n_9\}$ as a result of changes to the network schematic, the two access lists may correspond to two different Q-tables, whereas the two access lists would correspond to a single Q-table in the approach where indexes are used for the n dimension values. An advantage of using actual relay agents as the n dimension values may be the increased granularity in the Q-table data as a result of the Q-table only comprising data corresponding to the exact agents in the access list, as opposed to the coarser granularity that may result from using indexes for the n dimension values with the Q-table comprising data that may be shared across different access lists of the same size. However, a disadvantage of using actual relay agents as the n dimension values may be the large number of distinct Q-tables that must be maintained, a number which may quickly become too large to be computationally feasible to handle as the number of relay agents and access lists increases with an increasing network. On the other hand, using indexes as the n dimension values may not lead to such a problem as the number of Q-tables scales more linearly as the number of relay agents and access lists increases with an increasing network. It may be noted that the approaches described herein are only meant as examples and that many other approaches may be appropriate.

A second dimension t of the Q-table may represent the maximum number of consecutive time slots that the source agent may communicate via any given relay agent. A time slot as used herein may be understood to be the smallest duration unit that contains the data or bits for transmission. In some systems, a time slot may be a frame. In other systems, a frame may be broken into many time slots where those time slots may be assigned to different agents or the same agent. The number of time slots per second and the number of bits per time slot determine the data rate for a network. As such, the values for the t dimension may be an array of indexes representing each distinct time slot where the source agent may perform an action. It may be noted that the t dimension values in a Q-table may just be a reference for a source agent at a given time slot. The actual number of time slots that a source agent has been communicating via a given relay agent may not necessarily be tracked by the Q-table, and may instead be tracked separately, such as within the source agent itself. The t dimension values may just be referenced and compared to the separately tracked time slots in order to retrieve the relevant data in the Q-table when necessary.

Finally, the third dimension a of the Q-table may represent the number of actions that the source agent may take at each time slot. The "actions" that the source agent may take may correspond to the relay agents in the access list that the source agent may transition to and then subsequently communicate through. As such, the values of the a dimension may be of the same kind as the values of the n dimension, namely either indexes that map to specific relay agents or the actual relay agents themselves. It may be noted that while either approach may be appropriate, it may also be necessary to consider whether it would be appropriate to ensure that the type of values for the a dimension match those of the n dimension. For the example network in FIG. 2, in the Q-table for $n_1$ as the source agent, the a dimension may have a size of 3, corresponding to each of the relay agents in $n_1$'s access list that $n_1$ may transition to communicating through. It may be noted that since $n_1$ may have already been communicating through one of the relay agents and yet all three relay agents are possible actions, that means that $n_1$ may transition to the same relay agent, or effectively not transitioning relay agents at all.

The three dimensions of the Q-table may be used to uniquely identify actions by the source agent and retrieve the appropriate data from the Q-table. Given some relay agent $n_a$ from the n dimension, some time slot ta from the t dimension, and some action at, which may correspond to a relay agent $n_b$ from the access list that the source agent may transition to communicating through, from the a dimension, the three dimensions may uniquely identify the scenario when the source agent takes action at to transition from communicating via the $n_a$ relay agent to communicating via the $n_b$ relay agent at time slot ta. More specifically, and referring to the example network of FIG. 2 where the access list of $n_1$ is mapped to the indexes {0, 1, 2}, the combination of values (0, 4, 2) corresponding to the n, t, and a dimensions may identify the scenario where the source agent $n_1$ transitions from communicating via the $0^{th}$ relay agent $n_2$ to communicating via the $2^{nd}$ relay agent $n_5$ after 4 consecutive time slots of communicating via the $0^{th}$ relay agent, and thus enable the appropriate data for that scenario to be retrieved from the Q-table. In various embodiments, the source agent may include a time slot counter, which may be implemented as a software module that is integrated into the source agent, that maintains a tracking parameter for the number of consecutive time slots that the source agent has been communicating via the current relay agent. The time slot counter may increment the tracking parameter at each consecutive time slot that the source agent communicates via the current relay agent, and may reset the tracking parameter once the source agent transitions to communicating via a new relay agent.

The data that is comprised in the Q-table may be the predicted utility or predicted rewards, which may also be referred to as Q-values, that the source agent may expect to receive as a result of following a given scenario. The Q-table may comprise an entry corresponding to each combination of the values along the three dimensions n, t, and a, where each entry comprises the predicted reward for the scenario defined by the specific combination of values in the three dimensions. More specifically, and referring to the example network of FIG. 2 where the access list of $n_1$ is again mapped to the indexes {0, 1, 2}, the entry corresponding to the combination of values (0, 4, 2) for the n, t, and a dimensions may comprise some value r, where r is the actual reward or gain that the source agent may expect to receive as a result of transitioning from communicating via the $0^{th}$ relay agent $n_2$ to communicating via the $2^{nd}$ relay agent $n_5$ after 4 consecutive time slots of communicating via the $0^{th}$ relay agent. The same type of data may be in each entry of the Q-table corresponding to all the possible combinations of values along the n, t, and a dimensions.

Because the Q-table may be utilized immediately in method 300, it may not be optimal for the Q-table to comprise random data in its entries when it is initially deployed. Instead, it may be more optimal if the Q-table is deployed with relatively accurate and useful data such that the Q-learning based method 300 does not waste a potentially large amount of work over numerous iterations using random Q-table data. As such, the Q-table may be pre-trained offline before it is deployed to a source agent and utilized in method 300. The offline pre-training may be done via a computer simulation of the source agent that the Q-table will eventually be deployed to interacting with an environment that is representative of a real environment that the source agent will be a part of. The simulated environment may contain intelligent attackers representative of those that may seek to attack a communication network. As part of the pre-training, the Q-table may be initially randomized, with the data being updated following a Q-learning process that may be similar to method 300. The pre-training may continue until the data in the Q-table converges, with only small variations around the average predicted reward amount. Convergence may be monitored and determined by an operator that runs the offline pre-training and/or may be automated in the simulation. Once the pre-training has completed, the pre-trained Q-table may be deployed along with the corresponding source agent where it may be fine-tuned further.

The Q-tables may be stored in any place where the source agent may be able to access them. In various examples of the present disclosure, the Q-tables may simply be stored as part of the source agent. In such examples, the source agent may have complete control and access to the Q-tables which may also be accessed very quickly. In various other examples, the Q-tables may be stored in a database separate from the source agent, which the source agent may query to retrieve the appropriate Q-table as necessary. Examples of the present disclosure may elect to decouple the storage of the Q-tables from the source agents as it may enable more secure storage of the Q-tables, even if it may come at some additional retrieval overhead for step 320.

Figure 4A:
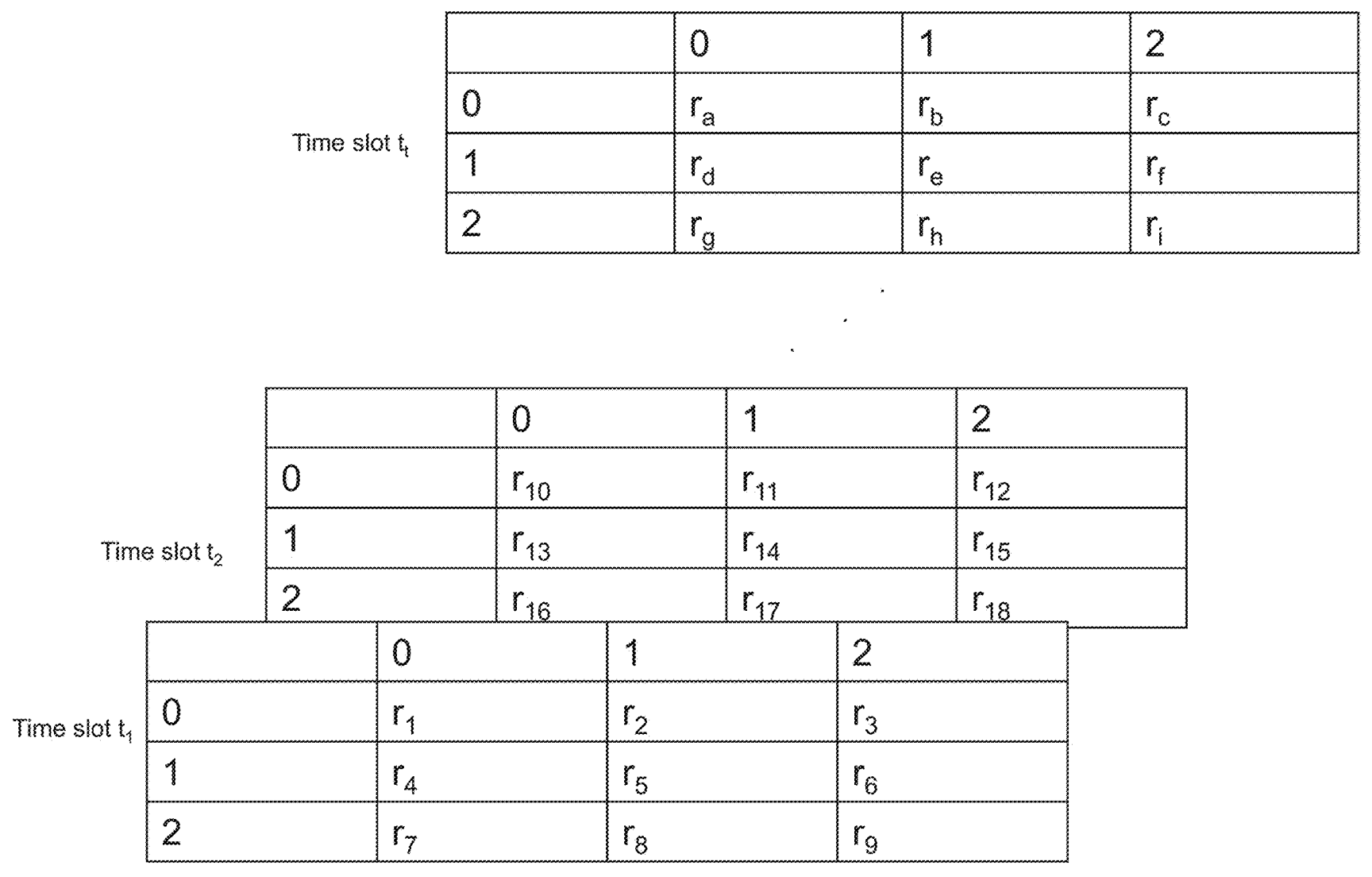

FIGS. 4A-4C illustrate example implementations of a three-dimensional Q-table as described herein. It may be noted that each of the figures depicts a single Q-table and not a plurality of Q-tables. In the example implementation in FIG. 4A, the Q-table may comprise a series of two-dimensional tables. Each of the tables may correspond to the possible transitions by the source agent at a given time slot. More specifically, the first table with label time slot $t_1$ may correspond to the possible transitions that a source agent may make at time slot $t_1$, the second table with label time slot $t_2$ may correspond to the possible transitions that the source agent may make at time slot $t_2$, and so on, up to time slot $t_t$ which corresponds to the possible transitions at the maximum time slot of the t dimension of the Q-table. Within each of the tables, the rows may comprise the relay agents in the source agent's access list, representing the relay agents that the source agent may originally be communicating through at the time slot associated with the table. The columns of each table may comprise the actions that the source agent may take at the time slot associated with the table. Each cell in each of the tables may comprise the predicted reward associated with the source agent transitioning from communicating via the relay agent in the row of the cell to communicating via the relay agent in the column of the cell at the time slot associated with the particular table. More specifically, and referring back to the example network of FIG. 2 where the access list of $n_1$ is mapped to the indexes {0, 1, 2}, the Q-table entry corresponding to the combination of values (0, 1, 2) for the n, t, and a dimensions may represent the scenario where the source agent $n_1$ transitions from communicating via the $0^{th}$ relay agent $n_2$ to communicating via the $2^{nd}$ relay agent $n_5$ at time slot 1. In this scenario, the appropriate Q-table entry in the example implementation of FIG. 4A may be in the first table as that is the table for time slot $t_1$, which may be assumed to be equivalent to time slot 1 for the purposes of this example scenario. In the first table, the source agent was originally communicating through the $0^{th}$ relay agent, which corresponds to the first row, and the source agent transitions to communicating through the $2^{nd}$ relay agent, which corresponds to the third column. As a result, the cell corresponding to the Q-table entry for the above scenario is in the first row third column of the first two-dimensional table, and the source agent may expect a reward of $r_3$ for the above scenario.

FIG. 4B illustrates another example implementation of a Q-table as described herein. In the example implementation in FIG. 4B, the Q-table may comprise a single two-dimensional table where the rows comprise a two-tuple representing the scenario for a source agent transitioning away from communicating via a relay agent $n_a$ at a time slot $t_t$. In other words, the rows in the table may comprise all of the possible combinations along the n and t dimensions of the Q-table. The columns of the table may represent the actions that the source agent may take at each time slot. In other words, the columns in the table correspond to the values of the a dimension of the Q-table. Each cell in the table may comprise the predicted reward associated with the source agent transitioning from communicating via the relay agent at a time slot in the two-tuple of the row of the table to communicating via the relay agent in the column of the table. More specifically, and again referring back to the example network of FIG. 2 where the access list of $n_1$ is mapped to the indexes {0, 1, 2}, the Q-table entry corresponding to the combination of values (0, 1, 2) for the n, t, and a dimensions may be the table cell with the row being the two-tuple (0, 1) and the column being 2. In the example implementation of FIG. 4B, the first row comprises the two-tuple (0, 1) and the third column comprises the value 2 for the a Q-table dimensions, and thus the predicted reward for the above scenario may be in the cell in the first row and third column of the table. As such, for the above scenario using the example implementation of FIG. 4B, the source agent may expect a reward of $r_3$.

FIG. 4C illustrates a third example implementation of a Q-table as described herein. In the example implementation in FIG. 4C, the Q-table may comprise a single two-dimensional table with a first column comprising three-tuples for each combination of values for the n, t, and a dimensions of the Q-table and a second column comprising the predicted reward for a given combination of values for the n, t, and a dimensions. In other words, each row of the table may comprise a three-tuple with values for each of the n, t, a dimensions representing a specific scenario and the corresponding predicted reward for that specific scenario. Again referring back to the example network of FIG. 2 where the access list of $n_1$ is mapped to the indexes {0, 1, 2}, the Q-table entry corresponding to the combination of values (0, 1, 2) for the n, t, and a dimensions may be the table cell with the row being the three-tuple (0, 1, 2) and the column for the predicted reward. In the example implementation in FIG. 4C, the (0, 1, 2) three-tuple is in the third row, and the predicted reward column indicates that a source agent may expect a reward of $r_3$ for the scenario defined by the combination of values (0, 1, 2) for the n, t, and a dimensions. At this point, it may be noted that the example Q-table implementations in FIGS. 4A-4C are meant solely as examples and not to be limiting in any way of the possible implementations for the Q-tables as described herein. While three example implementations may be described in the present disclosure, many other implementations for the Q-table may be appropriate.

Referring back to method 300 of FIG. 3, at step 330, the source agent may use the Q-table that was accessed at step 320 to transition from communicating via the current relay agent at some time slot to communicating via a new relay agent. In order to determine which relay agent to transition to communicating through, the source agent may identify the entry in the Q-table with the greatest predicted reward from among the entries associated with all the possible actions that the source agent may take from the current relay agent at the current time slot. In other words, the source agent may consider the predicted rewards for transitioning to communicating through each of the other available relay agents in the access list and may select the new relay agent to communicate through based on which of the relay agents in the access list may provide the greatest predicted reward to the source agent for transitioning to that relay agent. More specifically, and referring back to the example network of FIG. 2 where the access list of the source agent $n_1$ is mapped to the indexes {0, 1, 2}, if the source agent $n_1$ in FIG. 2 is currently communicating via the $0^{th}$ relay agent $n_2$ for two consecutive time slots, the source agent may determine which relay agent to transition to communicating through by determining which relay agent may provide the greatest predicted reward, or effectively, which action associated with the relay agents corresponds to the greatest predicted reward in the Q-table accessed in step 320. Using the example Q-table implementation of FIG. 4A, the second table may correspond to communicating via the current relay agent for two time slots, and the first row of that table corresponds to the source agent currently communicating via the $0^{th}$ relay agent in the source agent's access list. From the table, the predicted reward that the source agent may obtain for transitioning to communicating through the $0^{th}$, $1^{st}$, and $2^{nd}$ relay agent is $r_{10}$, $r_{11}$, and $r_{12}$, respectively. In other words, the source agent may expect to receive a reward of $r_{10}$ for transitioning from communicating via the $0^{th}$ relay agent to communicating via the $0^{th}$ relay agent at the second time slot, or effectively, continuing to communicate though the $0^{th}$ relay agent at the second time slot. Alternatively, the source agent may expect to receive a reward of $r_{11}$ for transitioning to communicating via the $1^{st}$ relay agent at the second time slot and a reward of $r_{12}$ for transitioning to communicating via the $2^{nd}$ relay agent at the second time slot. The source agent may then determine which of the predicted rewards $r_{10}$, $r_{11}$, and $r_{12}$ is greatest, and based on which predicted reward is greatest, elect to transition communicating through the relay agent corresponding to the greatest predicted reward. Supposing rig was determined to be the greatest among the three predicted rewards, the source agent may transition to communicating via the $2^{nd}$ relay agent after communicating via the $0^{th}$ relay agent after two time slots. It may be noted that $r_{12}$ was chosen arbitrarily, and an equivalent transition may happen if either $r_{10}$ or $r_{11}$ was determined to be the greatest.

In most iterations of step 330, the source agent may determine which relay agent from the access list to transition to communicating through based on which transition may provide the greatest predicted reward. However, in some minority of iterations based on a small probability E, which slowly decays over time, the source agent may determine which relay agent to transition to by randomly selecting one of the relay agents from the access list regardless of the predicted rewards. These randomized transitions may correspond to the exploration strategy that are often employed in reinforcement learning related algorithms such as the Q-learning based of method 300. By enabling the source agent to explore other possible transitions beyond strictly adhering to the Q-table, the source agent may have an increased chance to discover the optimal transitions that may have been missed by exploring solely based on the Q-table. The probability E may decay over time to reduce the chance of the source agent randomly exploring other relay agents as the values in the Q-table converge over time. The probability E may be a parameter that is configured with an initial value, such as 0.995, and decays over time to a minimum threshold, such as 0.005. The probability E may also decay in various manners, such as linearly or exponentially.

In various examples of the present disclosure, an operational or observational center may be deployed alongside the communication network. The operational center may monitor and detect information on network attackers, such as the jammer 140 in FIG. 1. Although the communication network and the network agents may not be aware of attackers prior to the actual attack, the operational center may record information on the attacks during and/or after they have happened. The operational center may compile information from across various attacks on the network and/or other analogous communication networks, where the information may include the attackers' geolocations, the attackers' activities, and the likelihoods that the attackers attack again, among many other possible types of information. The operational center may broadcast this information at periodic intervals to the source agent executing method 300. The source agent may take the broadcasted information and construct a weight vector W, where the weight vector may comprise biases, preferences, or weights for the relay agents in the source agent's access list based on likelihoods that the relay agents may be attacked by adversaries. The source agent may then utilize the weight vector to determine which relay agent to transition to in step 330.

While determining which relay agent to transition to in step 330 may be based on some combination of the greatest predicted reward between the possible relay agents to transition to, randomly determining the relay agent, or based on the weight vector W, all three components may be taken into consideration to enable the most efficient transition in step 330. Algorithm 1 depicts the pseudocode for an example implementation incorporating the three components. In line 1, the index of the new relay agent that the source agent will transition to communicating through, n_idx, may be initialized with the index of the relay agent based on which relay agent in the access list is associated with the greatest value of the relay agents' respective predicted rewards weighted by the weight W. More specifically, and referring back to the example in FIG. 2 where the access list of the source agent $n_1$ is mapped to the indexes {0, 1, 2}, if the predicted rewards for the $0^{th}$, $1^{st}$, and $2^{nd}$ relay agents are $r_1$, $r_2$, and $r_3$, respectively, and the weight vector W=<$w_1$, $w_2$, $w_3$>, n_idx may be initialized with the index of the relay agent corresponding to the max of $r_1*w_1$, $r_2*w_2$, and $r_3*w_3$. Subsequently, at lines 2 through 5, a random probability, rand, is generated. The random probability rand is compared with E, which as discussed earlier is a small probability, in order to determine whether the action that the source agent will take, or equivalently the relay agent from the access list that the source agent will transition to, will be randomly determined. A typical value for E may be 0.1, which slowly decays over time. As E is a small probability, the condition rand>ε at line 2 may be assumed to be satisfied in the majority of instances, meaning that line 3 is executed in most instances. As a result, the action that the source agent takes will be based on the predicted rewards and weight vector W of line 1 in most cases. In the minority of instances where rand is less than the small probability E, the action of the source agent may be randomly chosen.

n_idx←max(($Q$(state(1),state(2),:))*$W$);

if rand>ε action←n_idx;

else action←choose a random agent from the access list;

end if;

Algorithm 1

As mentioned above, the source agent may track the current consecutive number of time slots it has been communicating via the current relay agent. This data may be tracked via a tracking parameter that is maintained as part of the source agent. At or after a time slot, the tracking parameter may be updated to reflect the current state of the source agent at or after the most recent time slot. If the source agent continues to communicate through the same relay agent as the previous time slot, the tracking parameter may simply be updated and/or incremented to reflect that fact. In the case where the source agent made a "transition" to the same relay agent it was communicating through before the transition, the tracking parameter may simply be updated and/or incremented to reflect that the source agent has effectively remained on the same relay agent, or the tracking parameter may instead be reset to reflect the fact that the source agent did indeed make a transition, even if the transition was to the same relay agent the source agent was previously communicating through. Both approaches may be appropriate in various examples of the present disclosure. Alternatively, if the source agent did transition to communicating through a relay agent different from the previous relay agent, the time slot tracking parameter may be reset to reflect that the source agent has only just transitioned to communicating through the current relay agent. Additionally, the source agent may maintain a threshold parameter representing a maximum number of consecutive time slots that the source agent may communicate through any single relay agent. The source agent may need to compare the time slot tracking parameter to this threshold parameter before updating the tracking parameter at each time slot to ensure the source agent has not exceeded the threshold. The threshold parameter may be maintained as a method of preventing the source agent from communicating through a single relay agent for too long, which may drastically increase the susceptibility to an adversary's attack. If the tracking parameter indicates that the source agent has reached the threshold parameter, various examples of the present disclosure may force the source agent to transition to another relay agent.

At step 340 of method 300, the source agent may receive data indicative of an actual reward for transitioning to communicating through a new relay agent in step 330. It may be noted that the actual reward received by the source agent in this step is the actual benefit or gain for transitioning to communicating through the new relay agent, whereas the predicted rewards utilized in step 330 were only the expected rewards for making a transition which may be primarily meant to aid in determining which relay agent the source agent should transition to communicating through. The actual reward may be determined by a destination agent that the source agent was in communication with. In the example network of FIG. 2, if $n_1$ is communicating with $n_7$, $n_7$ may be the destination agent and responsible for providing the actual reward to $n_1$. The destination agent may determine the actual reward upon receiving the communication, such as a message, from the source agent and subsequently transmit the actual reward back to the source agent. The reward from the destination agent may be based on a variety of features, including but not limited to the latency for the destination agent to receive the communication from the source agent, the throughput at the destination agent, and a quality of the communication when it arrives at the destination agent, among any other potential features. The reward may also be based on a signal-to-noise ratio (SNR) metric defined by $$r = \log_2(1 + SNR_{E2E}) \quad (1)$$

where the end-to-end SNR $SNR_{E2E}$ between the source and destination agents is given by $$\frac{1}{SNR_{E_2E}} = \sum_{n=1}^{L} \frac{1}{SNR(n)} \quad (2)$$

In (2), L may be the number of links between the source and destination agents in a relay path. In the example of FIG. 2, the relay path $n_1 \rightarrow n_2 \rightarrow n_3 \rightarrow n_7$ may correspond to an L value of 3, as there are three links between the source agent $n_1$ and the destination agent $n_7$. In (2), SNR(n) may be the SNR link between two agents. Alternatively or additionally, the reward may be based on the bit error rate (BER) metric defined by $$r = C * \log_{10}\left(\frac{1}{BER_{E_2E}}\right) \quad (3)$$

In (3), C may be a positive real number $1 < C < 5$, and the end-to-end BER from the source agent to the destination agent may be given by $$\frac{1}{BER_{E_2E}} = \sum_{n=1}^{N} \frac{1}{BER(n)} \quad (4)$$

In (4), N may be the number of relay agents in a relay path including the destination agent. For the relay path $n_1 \rightarrow n_2 \rightarrow n_3 \rightarrow n_7$, N may be 3, corresponding to the three relay agents $n_2$, $n_3$, and $n_7$. In (4), BER(n) may be the individual BER obtained at relay agent n.

The relay path that is used to transmit the actual reward from the destination agent back to the source agent may be different than the original relay path used to transmit communication from the source agent to the destination agent. More specifically, even though communication from the source agent may be transmitted to the destination agent via the relay path $n_1 \rightarrow n_2 \rightarrow n_3 \rightarrow n_7$, the destination agent may transmit the actual reward via a different relay path, such as $n_7 \rightarrow n_6 \rightarrow n_5 \rightarrow n_1$. This may be advantageous as it allows step 340, and maybe the method 300, to be resilient even in the face of asymmetrical attacks to the network. Such asymmetrical attacks may be attacks that occur after a communication completes from the source to the destination agent, but before the destination agent transmits the reward back to the source agent. More specifically, the relay path $n_1 \rightarrow n_2 \rightarrow n_3 \rightarrow n_7$ may be attacked and become disabled after the communication from $n_1$ reaches $n_7$. With the relay path disabled, the destination agent $n_7$ may be unable to transmit the reward back to the source agent $n_1$ along that path. Enabling the destination agent to transmit the reward via a different relay path may not only ensure the reward is able to be transmitted back to the source agent in the face of attacks, but may also allow the destination agent to update the reward to reflect the fact that the relay path was attacked by an adversary.

At step 350 of method 300, the source agent may update the appropriate entry in the Q-table corresponding to the transition to communicating via the new relay agent that was performed by the source agent in step 330. Essentially, the predicted reward or Q-value in the entry corresponding to the transition that the source agent took may be updated based on the actual reward received in step 340 such that the updated predicted reward in the Q-table entry more accurately reflects the reward that may be expected by the source agent when executing the transition corresponding to the Q-table entry. More specifically, and referring back to FIG. 4A as an example, assuming the transition executed in step 330 corresponded to the Q-table entry that is in the first row and third column of the table for time slot $t_2$ which may have had a predicted reward or Q-value of $r_{12}$, step 350 may update the value of $r_{12}$ based on the actual data received for the source agent transitioning from communicating via the $0^{th}$ relay agent to communicating via the $2^{nd}$ relay agent at time slot $t_2$. Using the actual reward value to update the Q-table entry based on the Q-learning algorithm as follows:

$$Q^{new}(state(1), state(2), action) \rightarrow Q^{old}(state(1), state(2), action)*(1-\alpha) + \alpha[r + \delta * \max Q(action, next\_state(2),:)];$$

In (5), state(1) may represent the relay agent or index of the relay agent the source agent was previously communicating through, state(2) may represent the number of consecutive time slots that the source agent communicated through state(1) before transitioning to communicating through another relay agent, and action may represent the relay agent or index of the relay agent that the source agent transitioned to communicating through. Additionally, $\alpha$ may represent the learning rate where $0<\alpha<1$, r may represent the actual reward received in step 340, and $\delta$ may represent the discount factor where $0<\delta<1$, where $\alpha$ and $\delta$ may be predefined and maintained within the source agent or any location that is accessible to the source agent. A typical value for the learning rate $\alpha$ may be 0.1, which slowly decays over time. A typical value for the discount factor $\delta$ may be 0.99. As indicated in (5), the updated Q-value in the Q-table entry may comprise the current Q-value scaled by one minus the learning rate, $1-\alpha$, along with a new value that comprises the actual reward r and an estimate of the optimal future value weighted by the discount factor $\delta$, where the new value is further scaled by the learning rate $\alpha$.

Method 300 as described thus far herein may be implemented in various examples of the present disclosure to allow source agents in a communication network to identify the optimal relay agent to communicate through at a given time slot t in order to strengthen the network's resilience to attacks by adversaries. However, it may be noted that the description of method 300 thus far may largely comprise each source agent operating independently of each and every other potential source agent in a communication network. Consequently, it may be possible that different source agents, while operating independently and without knowledge of the actions of other source agents, identify the same optimal relay agent to transition to at a time slot t and thus collide with one another. For example, and referring back to the example network of FIG. 2, the access lists of source agents n1 and n8 both comprise n2, so it may be possible that n1 and n8 both elect to communicate through n2 at some time slot t, resulting in n1 and n8 colliding with one another in the process. In communication networks that may not support concurrent access to relay agents or where such concurrent access negatively impacts the ability of the concurrently accessed relay agent to transmit communications, the rewards received by the source agents, n1 and n8 in the present example, for selecting relay agent n2 at the time slot t may degrade appropriately to reflect that fact. As such, it may be that source agents eventually learn to avoid accessing the same relay agents to avoid the collisions, degradation or loss of service that may result from the concurrent access as their respective Q-tables are refined. However, allowing agents to proceed with the Q-learning based method 300 independently may require a long time for the Q-tables of the source agents to converge to an extent that allows the source agents to effectively avoid collisions while still evading attacks by adversaries. Not only may this extended convergence period be too long to be practical in various examples, but such an approach may also run the risk of the source agents' Q-tables failing to converge at all.

Figure 5:
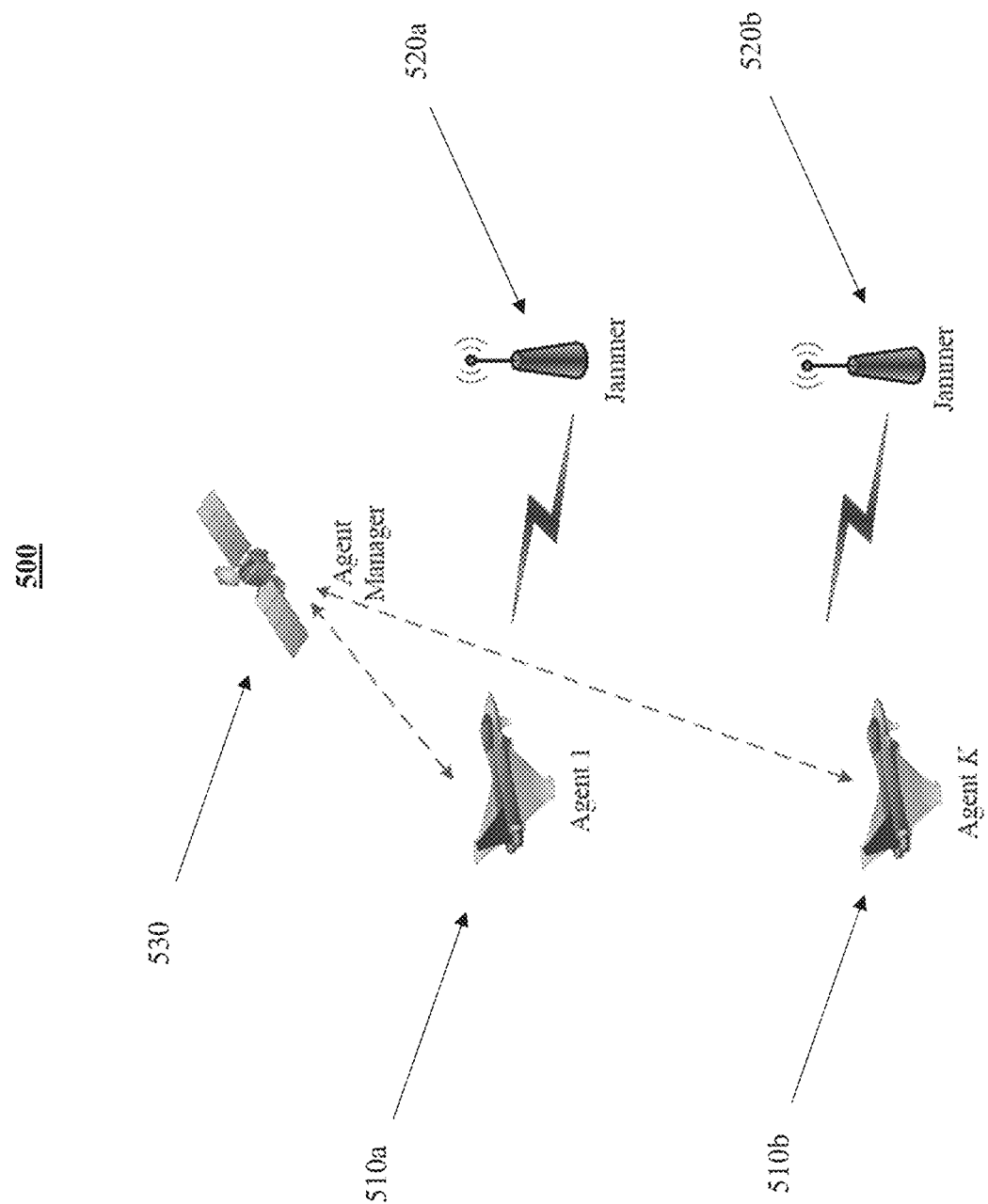
FIG. 5 illustrates an example scenario of attacks by jammers on a network that includes an agent manager.

In order to address the possibility of collisions in relay agent accesses and also to maximize the overall performance of method 300 in light of such a consideration, an agent manager may be incorporated into method 300 to assist in resolving any potential conflicts among the relay agent accesses. The agent manager may aim to maximize the total rewards that are received across all the source agents at a given time slot, and to that end, may assign relay agents to the involved source agents. FIG. 5 illustrates an example scenario 500 of attacks by jammers 520a and 520b on a network that includes an agent manager 530 in relation to source agents 510a and 510b. A network may comprise K active source agents from agent 1, corresponding to label 510a, up to agent K, corresponding to label 510b, which are in communication with a common agent manager 530. Each agent k, $1 \leq k \leq K$, may correspond to an access list $S_k$, and it may be assumed that for two source agents i and j, where $i \neq j$, $S_i \cap S_j \neq \emptyset$, where $S_i$ may represent the access list corresponding to source agent i and $S_j$ may represent the access list corresponding to source agent j. In other words, two different source agents may correspond to two different access lists that comprise at least one overlapping relay agent, such that it is possible that the two source agents may elect to transition to communicating through the same relay agent at a time slot and thus collide with one another. In one or more examples of the present disclosure, agent 1 up to agent K (510a and 510b) of FIG. 5 may correspond to multiple instances of the transmitting agent 110 of FIG. 1. The jammers 520a and 520b of FIG. 5 may also correspond to multiple instances of the jammer 140 of FIG. 1, where each of the jammers 520a and 520b of FIG. 5 may also attack the network according to some attack vector q.

Figure 6:
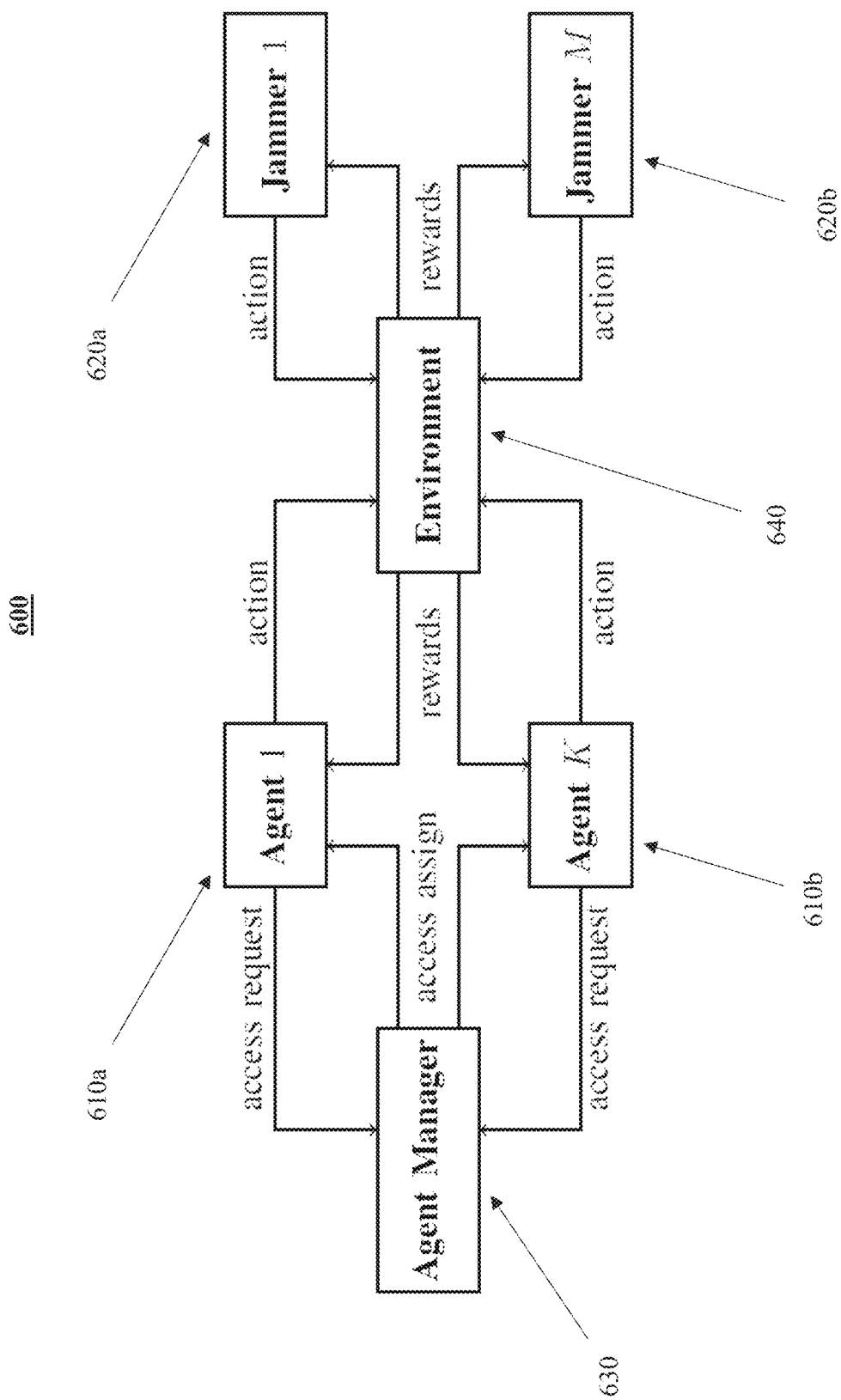
FIG. 6 illustrates an example schematic of how an agent manager may operate in a multi-agent network system according to some examples of the present disclosure.

FIG. 6 illustrates an example schematic 600 of how an agent manager 630 may operate in a multi-agent network system. Each agent from agent 1, corresponding to label 610a, up to agent K, corresponding to label 610b, may begin by sending an access request to the agent manager 630, where agent 1 up to agent K (610a and 610b) may correspond to the source agents that are initiating communications in the network system. The request may include a list of relay agents that the source agent may intend to access in order to communicate through, along with a set of Q-values or predicted rewards that the source agent may expect to receive for communicating through each of the relay agents. The agent manager 630 may then evaluate the requests from the source agents and assign access to a relay agent for each of the source agents 1 up to source agent K (610a and 610b) such that no two source agents from 1 up to K access the same relay agent or communicate through the same relay path, and thus no collision may occur. The source agents 1 up to K (610a and 610b) may then access the relay agent assigned to them by the agent manager 630, or equivalently, take the action assigned by the agent manager 630, and subsequently interact with the environment 640 which may bring the source agents into contact with attacks by jammers 620a and 620b. The source agents may then receive rewards based on their interaction with the environment 640 after taking the actions assigned by the agent manager 630, where the rewards may be used to update the source agents' respective Q-tables. An environment as referenced herein may be the communications network that the agents interact with to learn to identify which action to take, or which relay agent to communicate through, in light of the jamming attacks that may be present on the communications network.

The steps of method 300 as described above may largely remain unchanged when incorporating an agent manager 630. In particular, in at least some examples, only step 330 of method 300 may be altered as the new relay agent that the source agent may transition to communicating through may no longer be the relay agent with the greatest predicted reward from among the Q-table entries associated with all the possible actions that the source agent may take from the current relay agent at the current time slot. Instead, the source agent may send an access request to the agent manager 630 and then take an action after the agent manager 630 responds with an assigned relay agent. Accordingly, step 330 of method 300 may be altered to become one or more steps that may involve sending an access request to the agent manager 630, receiving an assigned relay agent to transition to communicating through from the agent manager 630, and then transitioning to communicating through the assigned relay agent, while the other steps of method 300 may still operate as described above.

As part of sending the access request to the agent manager 630, each source agent k, of K active source agents, may generate an action profile comprising the relay agents it may communicate through for some time slot t, denoted herein as 4. To encourage and reflect the exploitation-exploration trade-off often employed in reinforcement learning based methods such as method 300, the action profile 4 may be generated through a combination of two approaches. A first approach may be that the action profile 4 is generated as a random permutation of the relay agents in the source agent's access list with probability E. As described above for step 330, E may be a small probability that the source agent determines which relay agent to transition to by randomly selecting one of the relay agents from the access list regardless of the predicted rewards. In this case, the small probability E may determine when the source agent generates the action profile as a random permutation. The second approach may be that the action profile $a_k^t$ is generated such that the relay agents are ranked in descending order based on the Q-values or predicted rewards corresponding to the relay agents in the source agent's Q-table, where this approach is taken with probability 1-E. For example, and referring back to FIG. 2, if $n_1$ is the source agent k and relay agents $n_2$, $n_4$, and $n_5$ have Q-values of 6, 3, and 7, respectively, the action profile $a_k^t$ for $n_1$ may be $\{n_5, n_2, n_4\}$. It may be noted that the action profile $a_k^t$ may be implemented as any appropriate data structure, including but not limited to a list, set, or vector. The relay agents of the action profile $a_k^t$ may be sent to the agent manager 630 along with the Q-values corresponding to the relay agents. The corresponding Q-values may be sent along with the action profile in any appropriate manner, such as but not limited to: as a completely separate vector, list, or set where the Q-value in an index may be associated with the relay agent in the corresponding index of the action profile; as a separate vector list, or set, but wrapped together with the action profile into a larger data structure; or as part of the action vector, where the relay agent and corresponding Q-value comprise a sub-structure, such as a tuple.

After the agent manager 630 receives the action profile and Q-values from the K source agents, the agent manager 630 may resolve the relay agent assignment problem in one of two approaches. In the first approach, the agent manager 630 may assign relay agents to the K source agents using a random order of the K source agents. In this approach, the agent manager 630 may begin by initializing $A^t=\emptyset$ as the set of relay agents to be assigned to the source agents at some time slot t. The agent manager 630 may then generate a randomly permuted order of the K source agents. Subsequently, the agent manager 630 may loop through the action profiles in the order that they are associated with the random permutation of source agents, where for each action profile $a_k^t$, the agent manager 630 selects the first action $\alpha_k^t \in a_k^t$ such that $\alpha_k^t \notin A^t$. In other words, for each action profile, the agent manager 630 selects the first action, or relay agent for that source agent to transition to communicating through, from that action profile that has not already been assigned to another source agent. The agent manager 630 may then update $A^t \leftarrow A^t \cup a_k^t$ to ensure the most recently assigned action is not assigned again in the future before repeating the process for the next action profile.

The second approach that the agent manager 630 may take to resolve the relay agent assignment problem may be to assign relay agents to the source agents using the corresponding Q-values that the agent manager 630 received along with the action profiles. In this approach, the agent manager 630 may again begin by initializing $A^t=\emptyset$ as the set of relay agents to be assigned to the source agents at some time slot t. At the next step, the agent manager 630 may loop through the action profiles of the K source agents and assign relay agents to the source agents. This step may proceed with the agent manager 630 assigning the first relay agent from each of the action profiles as the relay agent for the corresponding source agents. If there are any collisions for a particular relay agent, which may arise if multiple action profiles have the same relay agent listed first, the agent manager 630 may assign the conflicting relay agent to the source agent that has the higher corresponding Q-value. The source agents that were not assigned the conflicting relay agent may then be assigned relay agents by identifying the next relay agent in their respective action profiles that does not result in a conflict, where any subsequent conflicts may be resolved in the same manner as above. In other words, if some relay agent $n_x$ is listed first in the action profiles for source agents $n_a$ and $n_b$ where the Q-value or predicted reward for $n_x$ is higher for $n_a$ than $n_b$, relay agent $n_x$ may be assigned to source agent $n_a$. Another interpretation for this scenario may be that the source agent $n_a$ and $n_b$ both individually identified that transitioning to communicating through relay agent $n_x$ corresponds to the greatest predicted reward, but source agent $n_a$ had a higher predicted reward and was thus assigned relay agent $n_x$ by the agent manager 630. Source agent $n_b$ may then be assigned the next relay agent in its action profile that does not result in a conflict, which may be the second or third or another later relay agent depending on possible conflicts with other action profiles. At may be updated after each assignment is made to track the relay agents that have been assigned, and the process may continue until all the source agents have been assigned a relay agent.

---
Algorithm 2
---
for each time slot t:
   Agent k generates action profile $a_k^t$
   Agent k sends $a_k^t$ and corresponding Q values to the agent manager
   Agent k receives action assignment $a_k^t$ from agent manager
   Agent k takes action $a_k^t \in a_k^t$ assigned by agent manager
   Agent k updates Q – table
---

It may be noted that both schemes for assigning relay agents may ensure that no conflicts arise between the source agents. Algorithm 2 depicts the pseudocode of the steps that a source agent k may execute at each time slot t when determining what relay agent to transition to as part of the Q-learning based method 300 that includes the agent manager 630. As indicated in the algorithm, a source agent k may first generate an action profile $a_k^t$, which may be based on the corresponding Q-values in agent k's respective Q-table, or as a random permutation of the relay agents in the agent's access list, as described above. The source agent may then send the action profile $a_k^t$ and the corresponding Q-values to the agent manager 630. Once the agent manager 630 has determined relay agent assignments, or equivalently the respective actions, for all the active source agents, where the presence or absence of other source agents may remain unknown to source agent k, the source agent k may receive its own assignment $a_k^t$ from the agent manager 630. The source agent k may then take the action $\alpha_k^t$ to transition to communicating through the relay agent indicated in the assigned action $\alpha_k^t$. The source agent k may then receive a reward for the action, which may be used to update the agent's Q-table. In various examples of the present disclosure, the first four steps of algorithm 2 may correspond to an adjusted step 330 of method 300 that includes the agent manager 630 while the final step may correspond to steps 340 and 350 of method 300 as described above.

In various examples of the present disclosure, the Q-learning based method 300 may be applied in any number of ways, such as integrating with 5G networks. 5G networks may present a prime application due to the various aspects of 5G that may complement the Q-learning based method 300. The ultra-wide bandwidths may enable a large capacity for the network to accommodate large numbers of network agents without forcing the agents to compete for resources or otherwise strain the network. The presence of multiple frequency bands may increase the effective area that may be covered by the method 300 while also helping to strengthen the network resilience by increasing the complexity and costs of attacks for adversaries. Additionally, wide coverage enabled through the use of more base stations may improve path diversity and may also be advantageous to the Q-learning based method. Efficient method operation may be supported by the low latency in 5G networks as it may minimize the delay when switching between base stations. Similarly, the massive multiple-in multiple-out (MIMO) of 5G with beam management may also support path diversity and greatly increase the effectiveness of method 300 by offering large numbers of possible communication path transitions. The method 300 may also operate alongside the Artificial Intelligence Radio Access Network (AI RAN) software that optimizes network performance and load balancing to further improve network resilience against adversary attacks.

Figure 7:
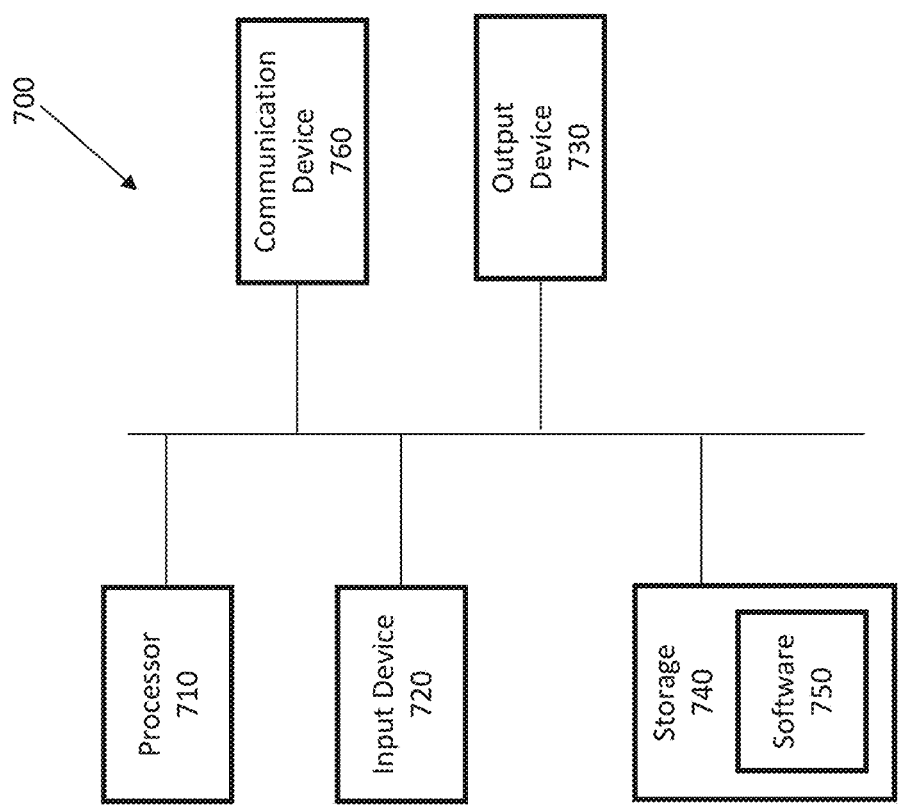
FIG. 7 illustrates an example of a computing system.

FIG. 7 illustrates an example of a computing system 700 that can be used for executing method 300 of FIG. 3. System 700 can be a computer connected to a network. System 700 can be a client or a server. System 700 can be any suitable type of processor-based system, such as a personal computer, workstation, server, handheld computing device (portable electronic device) such as a phone or tablet, or dedicated device. System 700 can include, for example, one or more of input device 720, output device 730, one or more processors 710, storage 740, and communication device 760. Input device 720 and output device 730 can generally correspond to those described above and can either be connectable or integrated with the computer.

Input device 720 can be any suitable device that provides input, such as a touch screen, keyboard or keypad, mouse, gesture recognition component of a virtual/augmented reality system, or voice-recognition device. Output device 730 can be or include any suitable device that provides output, such as a display, touch screen, haptics device, virtual/augmented reality display, or speaker.

Storage 740 can be any suitable device that provides storage, such as an electrical, magnetic, or optical memory including a RAM, cache, hard drive, removable storage disk, or other non-transitory computer readable medium. Communication device 760 can include any suitable device capable of transmitting and receiving signals over a network, such as a network interface chip or device. The components of the computing system 700 can be connected in any suitable manner, such as via a physical bus or wirelessly.

Processor(s) 710 can be any suitable processor or combination of processors, including any of, or any combination of, a central processing unit (CPU), field programmable gate array (FPGA), and application-specific integrated circuit (ASIC). Software 750, which can be stored in storage 740 and executed by one or more processors 710, can include, for example, the programming that embodies the functionality or portions of the functionality of the present disclosure (e.g., as embodied in the devices as described above), such as programming for performing one or more steps of method 300 of FIG. 3.

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport computer readable medium can include, but is not limited to, an electronic, magnetic, optical, electromagnetic, or infrared wired or wireless propagation medium.

System 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 700 can implement any operating system suitable for operating on the network. Software 750 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for strengthening communication network resilience, comprising, at a source agent of the communication network:
   accessing an access list comprising communication relay agents available to the source agent;
   accessing a Q-table, from among a plurality of Q-tables, that corresponds to the communication relay agents available to the source agent, wherein each entry in the Q-table indicates a predicted reward for transitioning from a first relay agent of the communication relay agents to a second relay agent of the communication relay agents at a specified time slot;
   transitioning from communicating via a current communication relay agent to communicating via a new communication relay agent at a time slot, wherein the new communication relay agent is determined based on a set of entries in the Q-table, wherein the set of entries comprises entries in the Q-table corresponding to transitioning from the current communication relay agent to each of the communication relay agents at the time slot;
   receiving data indicative of an actual reward for transitioning to the new communication relay agent; and
   updating the entry in the Q-table corresponding to the transition from the current communication relay agent to the new communication relay agent at the time slot based on the received data indicative of the actual reward.

2. The method of claim 1, wherein determining the new communication relay agent comprises the source agent sending data associated with the set of entries in the Q-table to an agent manager, wherein the agent manager is configured to determine the new communication relay agent using the data.

3. The method of claim 2, wherein the agent manager determines the new communication relay agent by identifying a communication relay agent from the access list that is different than each of a plurality of other relay agents in the communication network that are assigned to a plurality of other source agents in the communication network.

4. The method of claim 2, wherein the data that is sent to the agent manager comprises a random permutation of the communication relay agents.

5. The method of claim 2, wherein the data that is sent to the agent manager comprises the communication relay agents in a ranked order.

6. The method of claim 1, wherein the new communication relay agent is the second relay agent of the entry with the greatest predicted reward among the set of entries in the Q-table.

7. The method of claim 1, wherein the new communication relay agent is randomly selected from the communication relay agents according to a predefined probability.

8. The method of claim 1, wherein updating the entry in the Q-table comprises scaling an original predicted reward amount in the entry by a predefined learning rate and the received actual reward by a predefined discount factor.

9. The method of claim 1, wherein the Q-table is pre-trained offline before being deployed to the source agent.

10. The method of claim 1, wherein the source agent comprises a time slot counter for tracking a number of consecutive time slots the source agent has been communicating via a given communication relay agent, wherein the time slot counter increments at each time slot.

11. The method of claim 10, wherein the time slot counter resets after the source agent transitions to communicating via the new communication relay agent.

12. The method of claim 10, wherein the source agent comprises a time slot threshold for tracking a maximum number of consecutive time slots the source agent can communicate via the given communication relay agent.

13. The method of claim 12, wherein the source agent transitions to communicating via the new communication relay agent when the time slot counter reaches the time slot threshold.

14. The method of claim 1, wherein the received actual reward is based on a quality of a message received by a destination agent, wherein the message is communicated by the source agent through the new communication relay agent.

15. The method of claim 1, wherein the actual reward is received through one of the communication relay agents that is different than the new communication relay agent.

16. The method of claim 1, wherein the new communication relay agent is selected further based on a weight vector with weights for each of the communication relay agents, wherein the weights are based on a likelihood that each of the communication relay agents will be attacked by adversaries.

17. The method of claim 1, wherein the received actual reward is based on a signal-to-noise ratio.

18. The method of claim 1, wherein the received actual reward is based on a bit error rate.

19. One or more computer-readable non-transitory storage media embodying software for strengthening communication network resilience at a source agent of the communication network, the software comprising instructions operable when executed by a computing system to:
   access an access list comprising communication relay agents available to the source agent;

access a Q-table, from among a plurality of Q-tables, that corresponds to the communication relay agents available to the source agent, wherein each entry in the Q-table indicates a predicted reward for transitioning from a first relay agent of the communication relay agents to a second relay agent of the communication relay agents at a specified time slot;

transition from communicating via a current communication relay agent to communicating via a new communication relay agent at a time slot, wherein the new communication relay agent is determined based on a set of entries in the Q-table, wherein the set of entries comprises entries in the Q-table corresponding to transitioning from the current communication relay agent to each of the communication relay agents at the time slot;

receive data indicative of an actual reward for transitioning to the new communication relay agent; and update the entry in the Q-table corresponding to the transition from the current communication relay agent to the new communication relay agent at the time slot based on the received data indicative of the actual reward.

20. A system for strengthening communication network resilience at a source agent of the communication network, the system comprising one or more processors and a memory coupled to the one or more processors comprising instructions executable by the one or more processors, the one or more processors being operable when executing the instructions to cause the system to:

access an access list comprising communication relay agents available to the source agent;

access a Q-table, from among a plurality of Q-tables, that corresponds to the communication relay agents available to the source agent, wherein each entry in the Q-table indicates a predicted reward for transitioning from a first relay agent of the communication relay agents to a second relay agent of the communication relay agents at a specified time slot;

transition from communicating via a current communication relay agent to communicating via a new communication relay agent at a time slot, wherein the new communication relay agent is determined based on a set of entries in the Q-table, wherein the set of entries comprises entries in the Q-table corresponding to transitioning from the current communication relay agent to each of the communication relay agents at the time slot;

receive data indicative of an actual reward for transitioning to the new communication relay agent; and update the entry in the Q-table corresponding to the transition from the current communication relay agent to the new communication relay agent at the time slot based on the received data indicative of the actual reward.

\* \* \* \* \*